(12) United States Patent
Kusumoto

(10) Patent No.: US 7,093,636 B2
(45) Date of Patent: Aug. 22, 2006

(54) PNEUMATIC TIRE

(75) Inventor: Takuji Kusumoto, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 10/954,285

(22) Filed: Oct. 1, 2004

(65) Prior Publication Data
US 2005/0076990 A1    Apr. 14, 2005

(30) Foreign Application Priority Data
Oct. 6, 2003 (JP) .............................. 2003-347210

(51) Int. Cl.
B60C 15/00    (2006.01)
B60C 15/04    (2006.01)
B60C 15/05    (2006.01)

(52) U.S. Cl. ...................... 152/539; 152/540; 152/545; 152/552

(58) Field of Classification Search ..................... None
See application file for complete search history.

(56) References Cited

FOREIGN PATENT DOCUMENTS

| | | | |
|---|---|---|---|
| EP | 0 467 277 A | 1/1992 | |
| JP | 58 105806 A | 9/1983 | |
| JP | 11-28915 A | 2/1999 | |
| JP | 11 301224 A | 11/1999 | |

Primary Examiner—Justin R. Fischer
(74) Attorney, Agent, or Firm—Birch, Stewart, Kolasch & Birch, LLP

(57) ABSTRACT

The invention can firmly fix both ends of a carcass ply while maintaining a weight saving and an effect of inhibiting a bead damage high. A pneumatic tire is provided with a bead core (5) constituted by core separated pieces (20U, 20L) separated into upper and lower sides in a radial direction, a bead apex rubber (8) extending from an upper surface thereof to an upper side in the radial direction, and a carcass ply (6A) having a ply lock portion (11) locked to the bead core (5). The ply lock portion (11) is provided with an apex and core horizontal ply portion (31) pinched between the bead core (5) and the bead apex rubber (8), or a core lower ply portion (32) extending along a lower surface of the lower core separated piece (20L), or a lower middle vertical ply portion (33Lm) pinched between separated portions (20Li, 20Lo) formed by separating the lower core separated piece (20L) into inner and outer portions in a tire axial direction, in addition to a separated piece horizontal ply portion (30) pinched between the core separated pieces (20U, 20L).

13 Claims, 16 Drawing Sheets

PNEUMATIC TIRE

This Non-provisional application claims priority under 35 U.S.C. § 119(a) on Patent Application No(s). 2003-347210 filed in Japan on Oct. 6, 2003, the entire contents of which are hereby incorporated by reference.

BACKGROUND OF THE INVENTION

1. Field of the Invention

The present invention relates to a pneumatic tire in which both end portions of a carcass ply are pinched between separated pieces of a bead core without being protruded from the bead core to an upper side in a radial direction so as to be firmly locked.

2. Description of the Related Art

In a carcass ply a constituting a frame of the pneumatic tire, as generally shown in FIG. 16A, there is employed a structure in which ply fold-back portions a2 are provided in both ends of a ply main body portion a1 extending between bead cores c and c. The ply fold-back portion a2 is extended high to an outer side in a radial direction along an outer surface of a bead apex rubber b after being folded back to an outer side from an inner side in a tire axial direction around the bead core c. Accordingly, it is possible to firmly fix both ends of the carcass ply a, it is possible to prevent the carcass cord from being slack at a time of vulcanizing so as to make a tension force to be unevenly dispersed, and it is possible to prevent a so-called blow-by that the carcass ply a comes off from the bead core c so as to be deflected therefrom, from being generated.

However, the ply fold-back portion a2 increases a tire weight in the other hand, and generates a cord breakage, a cord end loose and the like on the basis of an application of a compression stress at a time when the tire is deformed, thereby causing a bead damage.

Accordingly, in recent years, as shown in FIG. 16B, a structure in which the bead core c is separated into upper and lower sides in a radial direction, and both end portions of the carcass ply a are pinched between upper and lower core separated pieces c1 and c2 is proposed, for example, in Japanese Unexamined Patent Publication No. 11-28915.

SUMMARY OF THE INVENTION

The present invention relates to an improvement of the separated structure, and an object of the present invention is to provide a pneumatic tire which can firmly fix both ends of a carcass ply, can intend a further uniformization of a carcass cord tension and can improve a uniformity while maintaining an effect of reducing a tire weight and inhibiting a bead damage which corresponds to an advantage of the separated structure.

In order to achieve the object mentioned above, in accordance with a first aspect of the present invention, there is provided a pneumatic tire comprising:

a bead core constituted by upper and lower core separated pieces arranged in a bead portion and separated in upper and lower sides in a radial direction;

a bead apex rubber extending from an upper surface in a radial direction of the bead core to an upper side in the radial direction; and a carcass ply constituted by a ply main body portion reaching the bead core of the-bead portion from a-tread portion via a side wall portion, and a ply lock portion connected to the ply main body portion and locked to the bead core, wherein the ply lock portion includes a separated piece horizontal ply portion pinched between the upper and lower core separated pieces, and an apex and core horizontal ply portion pinched between the upper surface in the radial direction of the bead core and the bead apex rubber, and there is no portion protruding to an upper side in the radial direction from the apex and core horizontal ply portion.

Further, in accordance with a second aspect of the present invention, there is provided a pneumatic tire comprising:

a bead core constituted by upper and lower core separated pieces arranged in a bead portion and separated in upper and lower sides in a radial direction;

a bead apex rubber extending from an upper surface in a radial direction of the bead core to an upper side in the radial direction; and a carcass ply constituted by a ply main body portion reaching the bead core of the bead portion from a tread portion via a side wall portion, and a ply lock portion connected to the ply main body portion and locked to the bead core, wherein the upper core separated piece is constituted by an upper inner separated portion and an upper outer separated portion separated into inner and outer sides in a tire axial direction, or the lower core separated piece is constituted by a lower inner separated portion and a lower outer separated portion separated into inner and outer sides in the tire axial direction, wherein the ply lock portion includes a separated piece horizontal ply portion pinched between the upper and lower core separated pieces, and a core lower ply portion extending along a lower surface of the lower core separated piece, and wherein there is no portion protruding to an upper side in the radial direction from the upper surface in the radial direction of the bead core.

Further, in accordance with a third aspect of the present invention, there is provided a pneumatic tire comprising:

a bead core constituted by upper and lower core separated pieces arranged in a bead portion and separated in upper and lower sides in a radial direction;

a bead apex rubber extending from an upper surface in a radial direction of the bead core to an upper side in the radial direction; and a carcass ply constituted by a ply main body portion reaching the bead core of the bead portion from a tread portion via a side wall portion, and a ply lock portion connected to the ply main body portion and locked to the bead core, wherein the lower core separated piece is constituted by a lower inner separated portion and a lower outer separated portion separated into inner and outer sides in the tire axial direction, wherein the ply lock portion is provided with a separated piece horizontal ply portion pinched between the upper and lower core separated pieces, and a lower middle vertical ply portion folded to a lower side in the radial direction from the separated piece horizontal ply portion, pinched between the lower inner separated portion and the lower outer separated portion and being intermittent therebetween, and wherein the ply lock portion 11 has no portion protruding to an upper side in the radial direction from the upper surface in the radial direction of the bead core and no portion protruding to a lower side in the radial direction from the lower surface in the radial direction of the bead core.

Since the present invention is structured as mentioned above, it is possible to achieve a high effect of reducing a tire weight and inhibiting bead damage. Further, it is possible to more firmly fix both ends of the carcass ply, and it is possible to improve uniformity on the basis of a further uniformization of a carcass cord tension.

DESCRIPTION OF THE PREFERRED EMBODIMENTS

A description will be given of an embodiment in accordance with the present invention together with an illustrated example.

Figure 1:
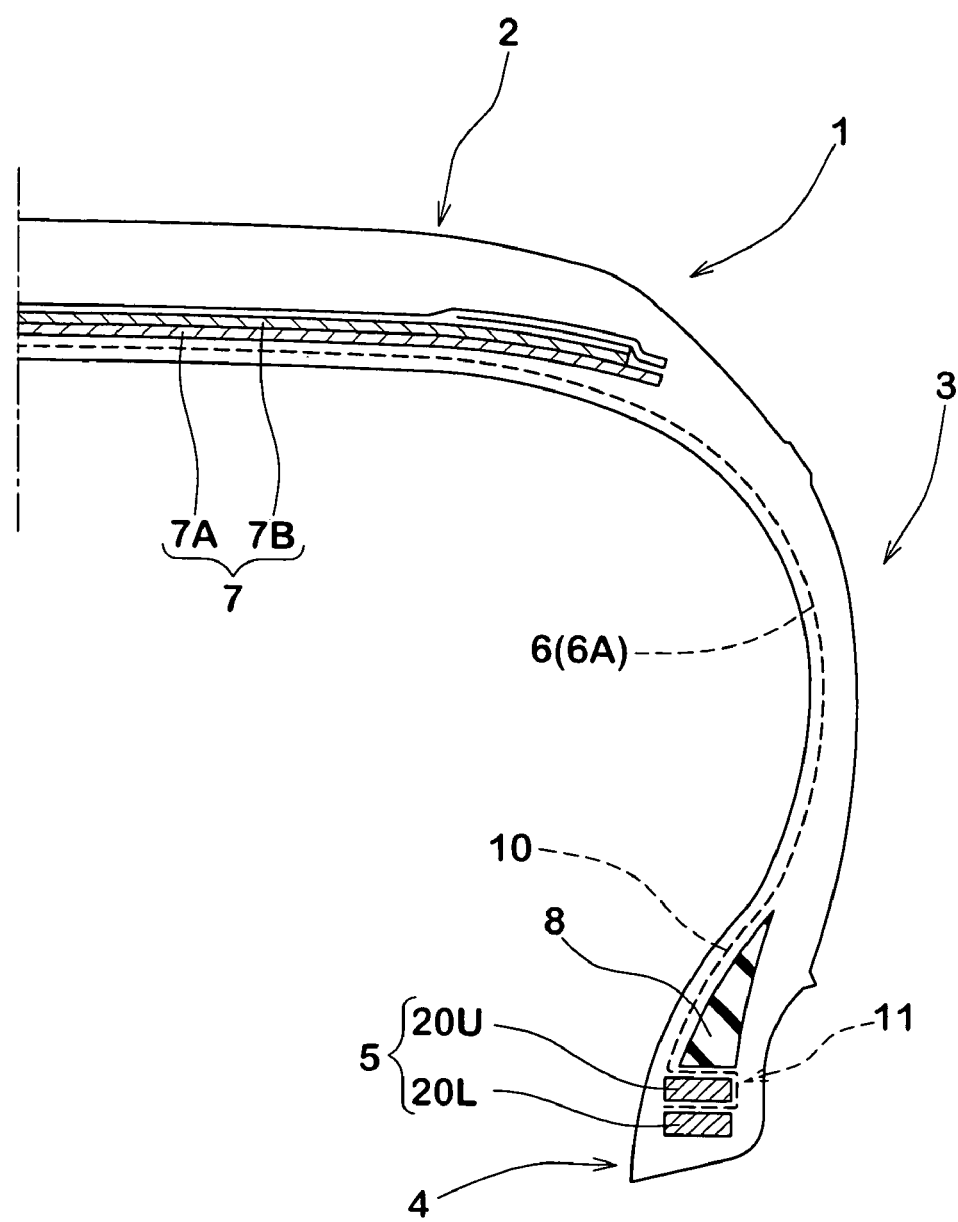
FIG. 1 is a cross sectional-view showing an example of a pneumatic tire in accordance with the present invention.

In FIG. 1, a pneumatic tire 1 is provided at least with a bead core 5 arranged in a bead portion 4, a bead apex rubber 8 extending to an upper side in a radial direction from an upper surface in a radial direction of the bead core 5, and a carcass 6 including a carcass ply 6A having a ply main body portion 10 reaching the bead core 5 of the bead portion 4 from a tread portion 2 via a side wall portion 3.

In the present example, there is exemplified a radial structure tire in which a tread reinforcing belt layer 7 is arranged in an upper side in a radial direction of the carcass 6 and within the tread portion 2. Two or more, two in the present example forms the belt layer 7, belt plies 7A and 7B in which a belt cord is arranged, for example, at about 10 to 35 degree with respect to a tire peripheral direction. The belt layer 7 increases belt rigidity on the basis of an intersection of the respective belt cords between the plies, and firmly reinforces approximately all the width of the tread portion 2 with a hoop effect. A steel cord is preferable as the belt cord, however, it is possible to employ a high modulus organic fiber cord such as a polyethylene naphthalate (PEN), a polyethylene terephthalate (PET), an aromatic polyamide or the like as occasion demands.

The carcass 6 is formed by one or more, one in the present example, carcass ply 6A in which the carcass cord is arranged, for example, at an angle of 70 to 90 degree with respect to the tire peripheral direction. An organic fiber cord, for example, a nylon, a polyester, a rayon, an aromatic polyamide or the like can be used as the carcass cord, and in particular, it is possible to preferably employ a polyester cord having a thickness of 1600 to 5000 dtex, and a rayon cord having a thickness of 2500 to 4000 dtex.

Figure 2:
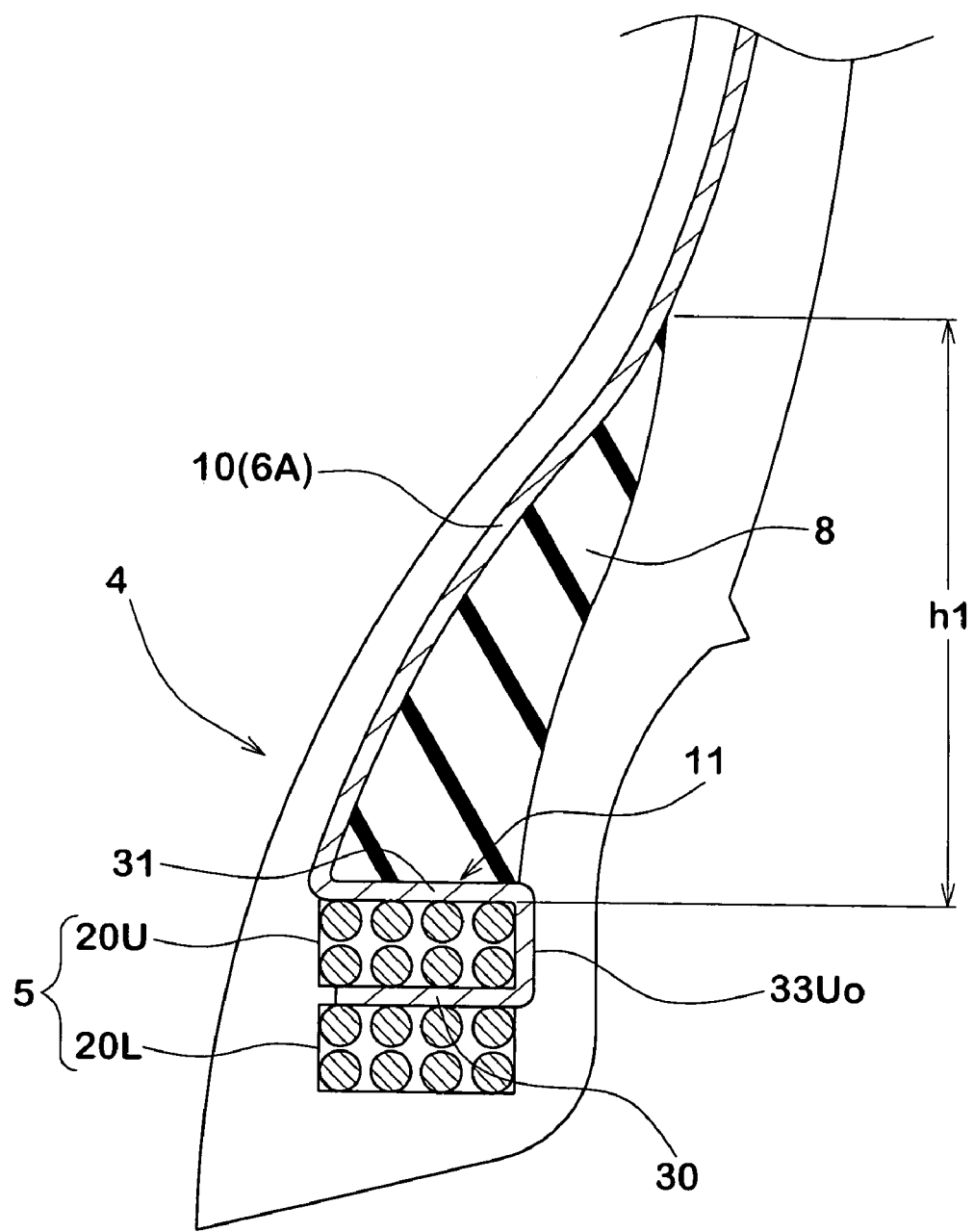
FIG. 2 is a cross sectional view showing an example of a bead structure in accordance with a first embodiment.

Next, the bead core 5 is constituted by a ring-shaped body having a rectangular cross sectional shape, and is formed by upper and lower core separated pieces 20U and 20L separated into upper and lower sides in a radial direction, as shown in FIG. 2 in an enlarged manner. Each of the core separated pieces 20U and an independent wound body, for example, constitutes 20L formed by winding a steel bead wire having a wire diameter of 0.8 to 1.60 mm. In the present example, there is exemplified a case in which each of the core separated bodies 20U and 20L is constituted by the same bead wire, however, a material and/or a wire diameter of the bead wire may be differentiated between the core separated bodies 20U and 20L.

Further, a bead apex rubber 8 extending from an upper surface in a radial direction of the bead core 5 to an upper side in the radial direction and having a triangular cross sectional shape is arranged in the bead portion 4. The bead apex rubber 8 is made of a hard rubber having a rubber hardness (a durometer A hardness) of 70 to 95 degree, a height h1 thereof in a radial direction from the bead core 5 is set to be equal to or more than 10 mm. In this case, it is preferable that the height h1 is set to be equal to or less than 60 mm in view of a ride quality, a road noise or the like.

Figure 16A:
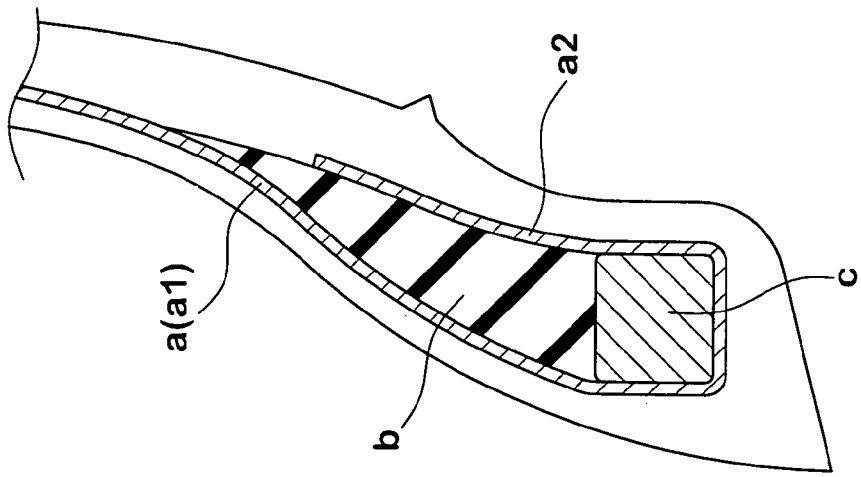
FIGS. 16A and 16B are cross sectional views describing a conventional bead structure.

Further, in the present invention, in order to firmly fix both ends of the carcass ply 6A, a ply lock portion 11 locked to the bead core 5 is provided in series in both ends of the ply main body portion 10 of the carcass ply 6A extending between the bead cores 5 and 5, without having the conventional fold-back portion (shown in FIG. 16A).

In this case, the following structures can be employed as the ply lock portion 11:

(1) a structure including a separated piece horizontal ply portion 30 pinched between the upper and lower core separated pieces 20U and 20L, and an apex and core horizontal ply portion 31 pinched between an upper surface in the radial direction of the bead core 5 and the bead apex rubber 8; or (2) a structure including a separated piece horizontal ply portion 30 pinched between the upper and lower core separated pieces 20U and 20L, and a core lower ply portion 32 extending along a lower surface of the lower core separated piece 20L; or (3) a structure including a separated piece horizontal ply portion 30 pinched between the upper and lower core separated pieces 20U and 20L, and a lower middle vertical ply portion 33Lm pinched between separated portions 20Li and 20Lo obtained by further separating the lower core separated piece 20L into inner and outer sides in the tire axial direction.

Accordingly, a description will be given below of a case of a first embodiment in which the ply lock portion 11 has the structure (1), a case of a second embodiment having the structure (2), and a case of a third embodiment having the structure (3) sequentially.

In the first embodiment, as shown in FIG. 2, the ply lock portion 11 is formed so as to include the separated piece horizontal ply portion 30 pinched between the upper and lower core separated pieces 20U and 20L, and the apex and core horizontal ply portion 31 pinched between the upper surface in the radial direction of the bead core 5 and the bead apex rubber 8.

In detail, the apex and core horizontal ply portion 31 is connected to the ply main body portion 10 in the present example. Further, the apex and core horizontal ply portion 31 is connected to the separated piece horizontal ply portion 30 via the upper outer vertical ply portion 33Uo extending to the lower side in the radial direction along an outer surface of the upper core separated piece 20U.

As mentioned above, since the ply lock portion 11 is increased in the folding number, for example, an S-shaped folding or the like, and is pinched at two positions, the ply lock portion 11 is firmly fixed by the bead core 5 while a developing length of the ply lock portion 11 is made small. Accordingly, it is possible to more securely inhibit the carcass cord from being slack at a time of vulcanizing so as to generate an uneven dispersion of the tension force, whereby it is possible to largely improve the uniformity. Further, the developing length of the ply lock portion 11 is small, and has no portion protruding to the upper side in the radial direction from the apex and core horizontal ply portion 31. Accordingly, as well as it is possible to achieve a weight saving, it is possible to prevent the compression stress from being applied to the ply lock portion 11 at a time when the tire is deformed, whereby it is possible to inhibit the cord break and the cord end loose from being generated.

Figure 3A:
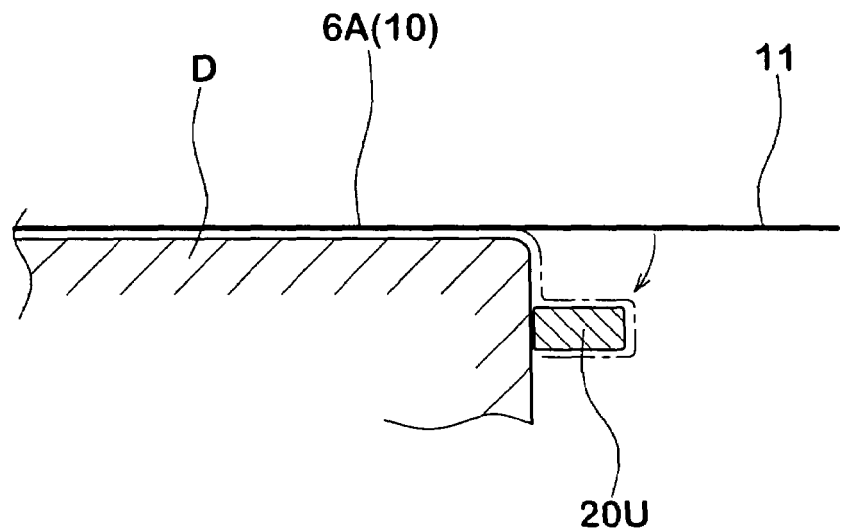
FIGS. 3A and 3B are views briefly showing a forming method of the bead structure in FIG. 2.
Figure 3B:
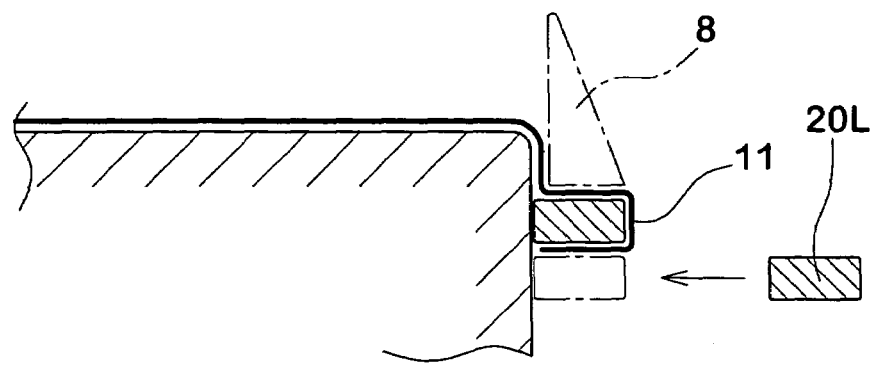

The bead structure mentioned above can be easily formed in accordance with a method as shown in FIGS. 3A and 3B. First, the carcass ply 6A is wound in a state in which the upper core separated piece 20U is arranged in both side surfaces of the drum D. Thereafter, the ply lock portion 11 protruding to the outer side in the tire axial direction from the ply main body portion 10 is wound downward in the radial direction along the upper surface, the outer surface and the lower surface of the upper core separated piece 20U. Thereafter, the lower core separated piece 20L is fitted to the lower surface side of the upper core separated piece 20U. In this case, the bead apex rubber 8 is mounted to the upper surface side of the core separated piece 20U via the ply lock portion 11, whereby it is possible to form the bead structure.

Figure 4A:
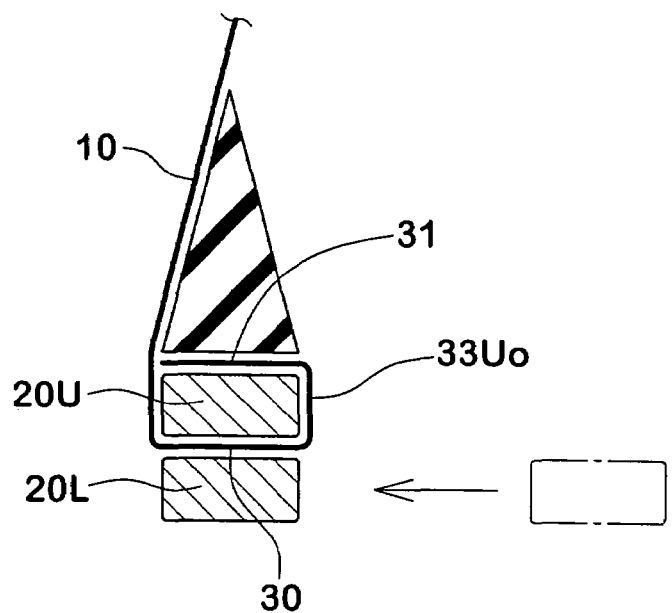
FIGS. 4A and 4B are cross sectional views in which the bead structure in FIG. 2 is changed.
Figure 4B:
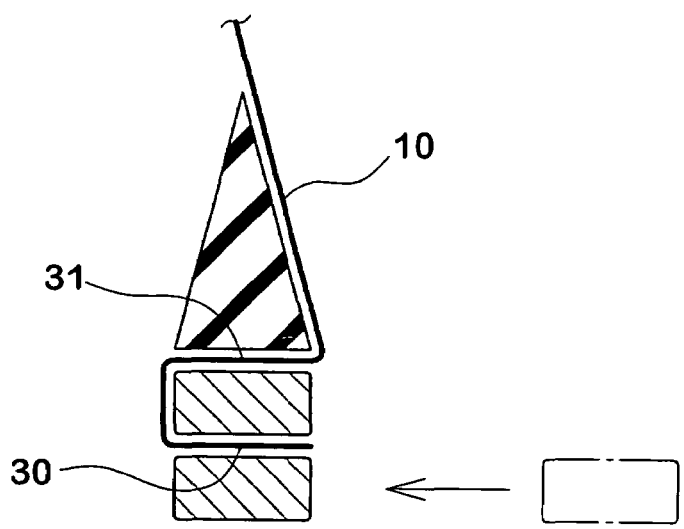

As the bead structure in accordance with the first embodiment, a structure shown in FIGS. 4A and 4B can be employed. In the structure shown in FIG. 4A, the separated piece horizontal ply portion 30 is continuously provided in the ply main body portion 10, and is connected to the apex and core. horizontal ply portion 31 via the upper outer vertical ply portion 33Uo extending to the upper side in the radial direction along the outer surface of the upper core separated piece 20U. Further, FIG. 4B shows the structure obtained by reversing the structure in FIG. 2. These structures are not preferable because the ply lock portion 11 tends to be displaced so as to be slack at a time of fitting the lower core separated piece 20L, however, can be employed as far as the cord path can be set while previously taking the displacement amount into consideration.

Figure 5A:
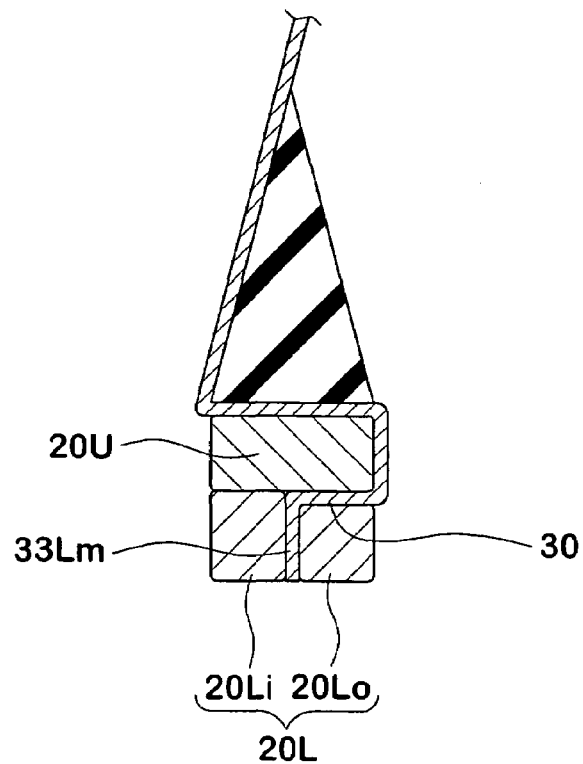
FIG. 5A is a brief view showing another example of the bead structure in accordance-with the first embodiment.

Further, FIG. 5A shows the other embodiment of the bead structure in accordance with the first embodiment. In the present example, the lower core separated piece 20L is constituted by a lower inner separated portion 20Li and a lower outer separated portion 20Lo, which are separated into inner and outer portions in the tire axial direction. Each of the separated portions 20Li and 20Lo is formed as an independent wound body from each other formed by winding the bead wire. Further, the separated piece horizontal ply portion 30 is continuously provided with a lower middle vertical ply portion 33Lm which is folded to a lower side in the radial direction and is pinched between the lower inner separated portion 20Li and the lower outer separated portion 20Lo. In the case mentioned above, it is possible to more firmly fix the ply lock portion 11 by the lower middle vertical ply portion 33Lm.

Figure 5B:
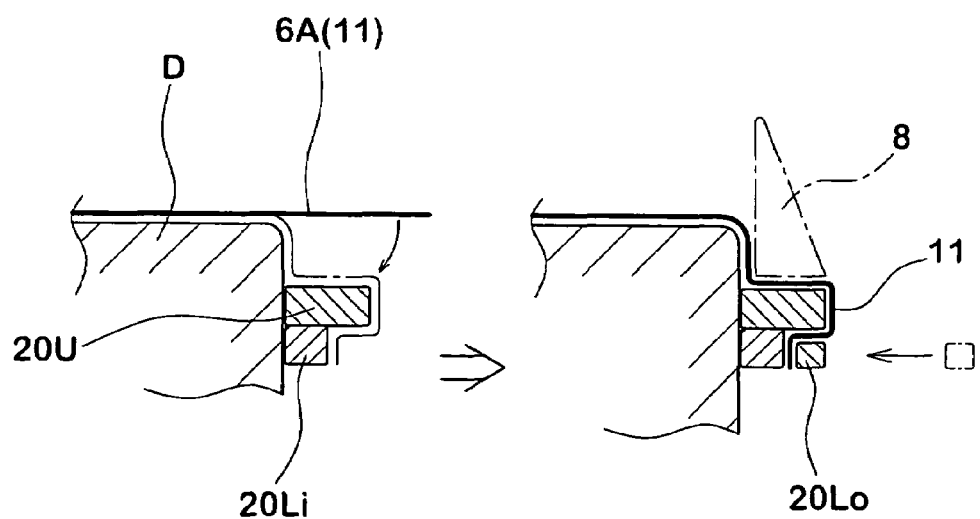
FIG. 5B is a brief view showing a forming method thereof.

The bead structure can be formed in accordance with a method shown in FIG. 5B. First, the carcass ply 6A is wound in a state in which the upper core separated piece 20U and the lower inner separated portion 20Li are arranged in both side. surfaces of the drum D. Thereafter, the ply lock portion 11 is wound downward along the upper surface, the outer surface and the lower surface of the upper core separated piece 20U, and the outer surface of the lower inner separated portion 20Li. Thereafter, the lower outer separated piece 20Lo is fitted to the lower surface side of the upper core separated piece 20U and the outer surface side of the lower inner separated portion 20Li. The bead apex rubber 8 is mounted to the upper surface side of the core separated piece 20U.

Figure 6A:
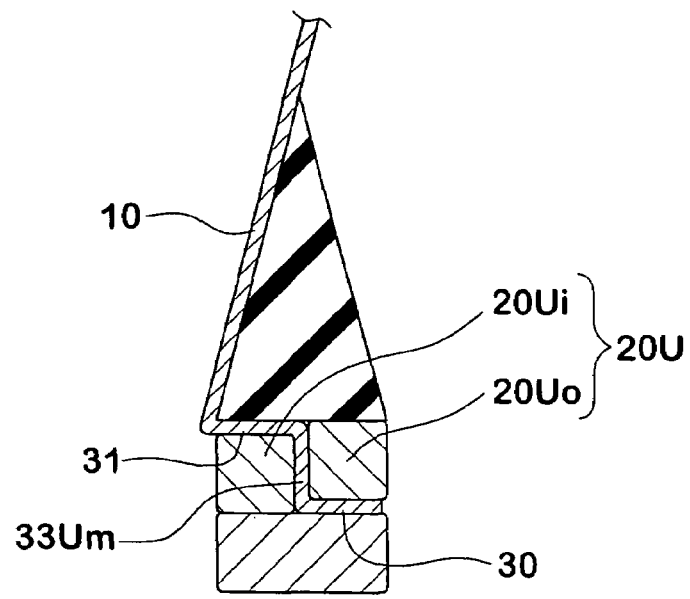
FIG. 6A is a brief view showing the other example of the bead structure in accordance with the first embodiment.

Further, FIG. 6A shows further the other embodiment of the bead structure in accordance with the first embodiment. In the present example, the upper core separated piece 20U is constituted by an upper inner separated portion 20Ui and an upper outer separated portion 20Uo, which are separated into inner and outer portions in the tire axial direction. Further, the apex and core horizontal ply portion 31 is connected to the separated piece horizontal ply portion 30 via an upper middle vertical ply portion 33Um which is folded to a lower side in the radial direction and is pinched between the upper inner separated portion 20Ui and the upper outer separated portion 20Uo. In the case mentioned above, it is possible to more firmly fix the ply lock portion 11 by the upper middle vertical ply portion 33Um.

Figure 7:
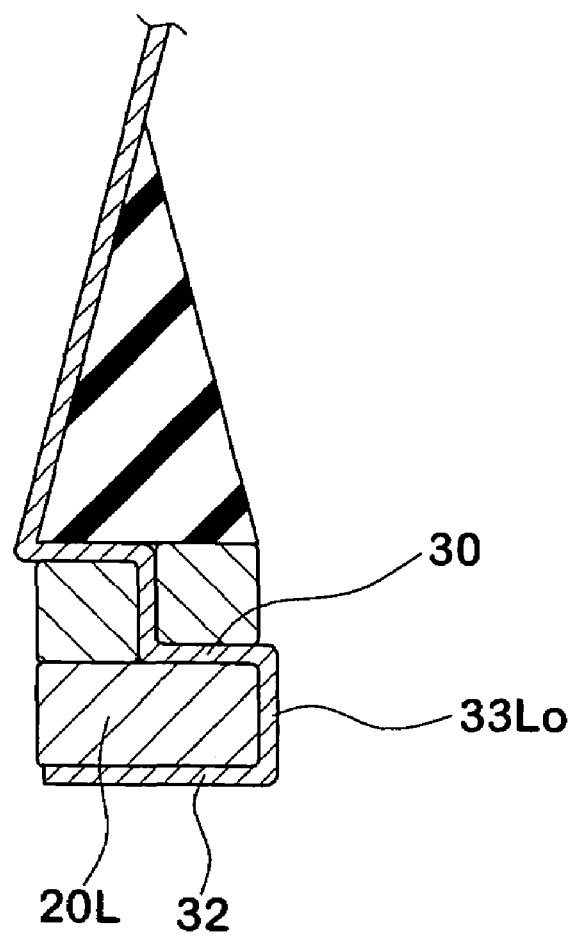
FIG. 7 is a brief view in which the bead structure in FIG. 6A is changed.

At this time, as shown in FIG. 7, the separated piece horizontal ply portion 30 is continuously provided with a core lower ply portion 32 extending along the lower surface of the lower core separated piece 20L via a lower outer vertical ply portion 33Lo extending to a lower side in the radial direction along the outer surface of the lower core separated piece 20L. In the case mentioned above, the core lower ply portion 32 is pinched between a bead ring (a metal mold portion receiving a bead portion) of the vulcanizing metal mold and the lower core separated piece 20L, in a state of being attached to the vulcanizing metal mold. Accordingly, it is possible to further firmly fix the ply lock portion 11.

Figure 6B:
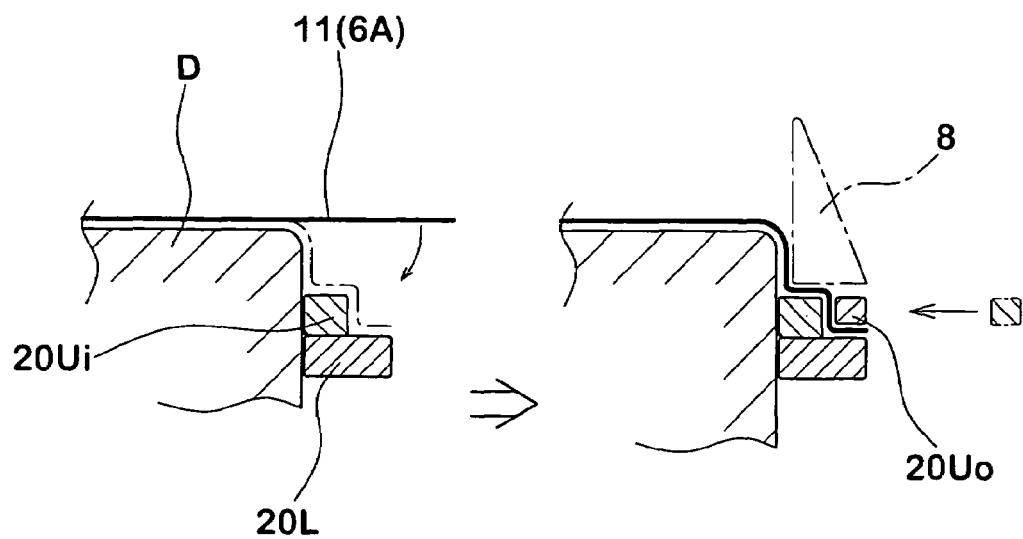
FIG. 6B is a brief view showing a forming method thereof.

In this case, the bead structure in FIGS. 6A and 7 can be formed in accordance with a method shown in FIG. 6B.

First, the carcass ply 6A is wound in a state in which the upper inner separated portion 20Ui and the lower core separated piece 20L are arranged in both side surfaces of the drum D. Thereafter, the ply lock portion 11 is wound downward along the upper surface and the outer surface of the upper inner separated portion 20Ui and the upper surface of the lower core separated piece 20L (in the bead structure in FIG. 7, the ply lock portion 11 is further wound downward along the outer surface and the lower surface of the lower core separated piece 20L). Thereafter, the upper outer separated portion 20Uo is fitted to the outer surface side of the upper inner separated portion 20Ui and the upper surface side of the lower core separated piece 20L. Further, the bead apex rubber 8 is mounted to the upper surface side thereof.

Figure 8A:
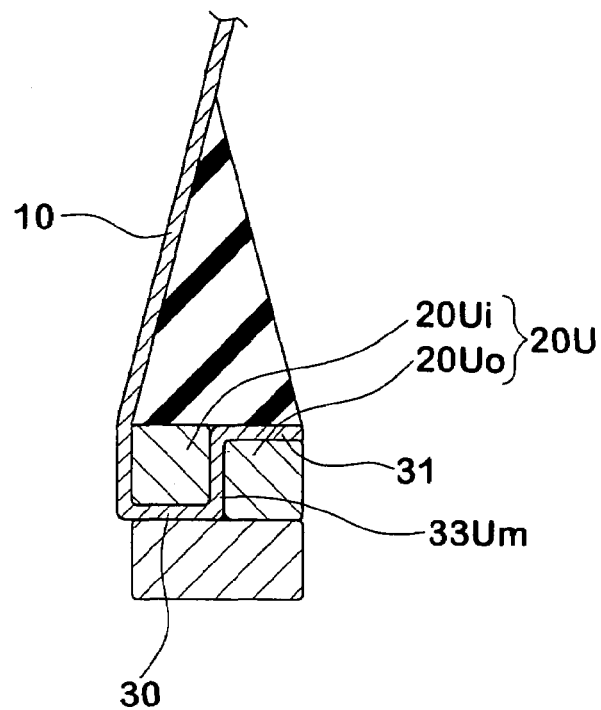
FIG. 8A is a brief view showing further the other example of the bead structure in accordance with the first embodiment.

Further, FIG. 8A shows further the other embodiment of the bead structure in accordance with the first embodiment. In the present example, the upper core separated piece 20U is constituted by an upper inner separated portion 20Ui and an upper outer separated portion 20Uo, which are separated into inner and outer portions in the tire axial direction. Further, the separated piece horizontal ply portion 30 is continuously provided in the ply main body portion 10. Further, the separated piece horizontal ply portion 30 is connected to the apex core horizontal ply portion 31 via the upper middle vertical ply portion 33Um which is folded to an upper side in the radial direction and is pinched between the upper inner separated portion 20Ui and the upper outer separated portion 20Uo. In the case mentioned above, it is possible to more firmly fix the ply lock portion 11 by the upper middle vertical ply portion 33Um.

Figure 9:
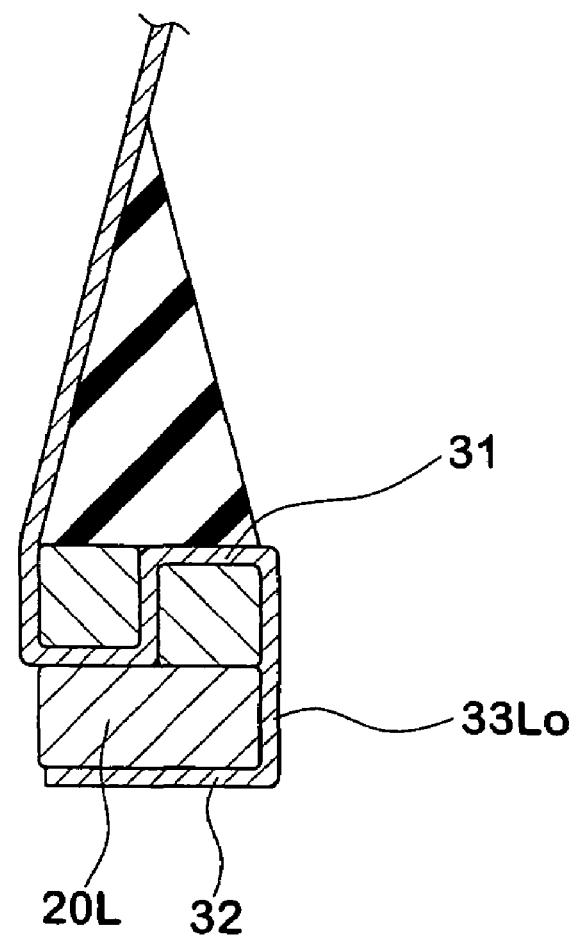
FIG. 9 is a brief view in which the bead structure in FIG. 8A is changed.

At this time, as shown in FIG. 9, the apex and core horizontal ply portion 31 may be continuously provided with the core lower ply portion 32 extending along the lower surface of the lower core separated piece 20L via an outer vertical ply portion 33o extending to a lower side in the radial direction along the outer surface of the bead core 5. In the case mentioned above, since the core lower ply portion 32 is pinched between the bead ring and the lower core separated piece 20L, in a state of being attached to the metal mold, the-ply lock portion 11 can be further firmly fixed.

Figure 8B:
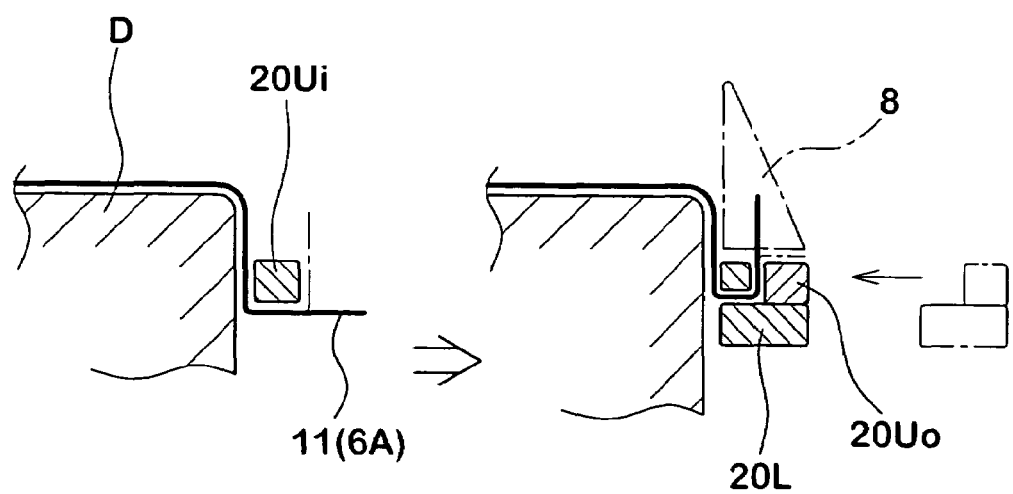
FIG. 8B is a brief view showing a forming method thereof.

In this case, the bead structure in FIGS. 8A and 9 can be formed in accordance with a method shown in FIG. 8B. First, after the ply lock portion 11 of the carcass ply 6A wound on the drum D is wound up along the inner surface, the bottom surface and the outer surface of the upper inner separated portion 20Ui, and the lower core separated piece 20L and the upper outer separated portion 20Uo are fitted to a bottom surface side and an outer surface side of the upper inner separated portion 20Ui. Thereafter, the wound-up portion of the ply lock portion 11 is folded along the upper surface of the upper outer separated portion 20Uo (in the bead structure in FIG. 9, the ply lock portion 11 is further wound downward along the outer surface of the upper outer separated portion 20Uo, the outer surface of the lower core separated piece 20L and the lower surface thereof). Further, the bead apex rubber 8 is mounted to the upper surface side.

A description will be given next of the bead structure in accordance with a second embodiment. In the bead structure, as shown in FIG. 1A, the upper core separated piece 20U is formed by the upper inner separated portion 20Ui and the upper outer separated portion 20Uo which are separated into inner and outer portions in the tire axial direction, or the lower core separated piece 20L is formed by the lower inner separated portion 20Li and the lower outer separated portion 20Lo which are separated into inner and outer portions in the tire axial direction.

Further, the ply lock portion 11 is formed so as to include the separated piece horizontal ply portion 30 pinched between the upper and lower core separated pieces 20U and 20L, and the core lower ply portion 32 extending along the lower surface of the lower core separated piece 20L. In this case, in accordance with the second embodiment, the ply lock portion 11 is formed so as to have no portion protruding to the upper side in the radial direction from the upper surface in the radial direction of the bead core. In other words, the apex and core horizontal ply portion 31 mentioned above is not held.

In this case, the core lower ply portion 32 is pinched between the bead ring and the lower core separated piece 20L in a state of being attached to the vulcanizing metal mold as mentioned above. Accordingly, in the second embodiment, the ply lock portion 11 is pinched at two positions while the folding number is increased in the same manner, thereby being firmly fixed. However, a pinching force to the core lower ply portion 32 tends to be weak in comparison with a pinching force to the separated piece horizontal ply portion 30 in relation to the rubber thickness below the core. Therefore, in the second embodiment, as shown in the drawing, it is preferable to form the ply portion, which is pinched between the separated portions 20Ui and 20Uo or between the separated portions 20Li and 20Lo.

Accordingly, in the present example, there is exemplified a structure in which the core lower ply portion 32 is connected to the ply main body portion 10, and the core lower ply portion 32 is connected to the separated piece horizontal ply portion 30 via a lower middle vertical ply portion 33Lm which is folded upward in the radial direction and is pinched between the lower inner separated portion 20Li and the lower outer separated portion 20Lo.

Figure 10A:
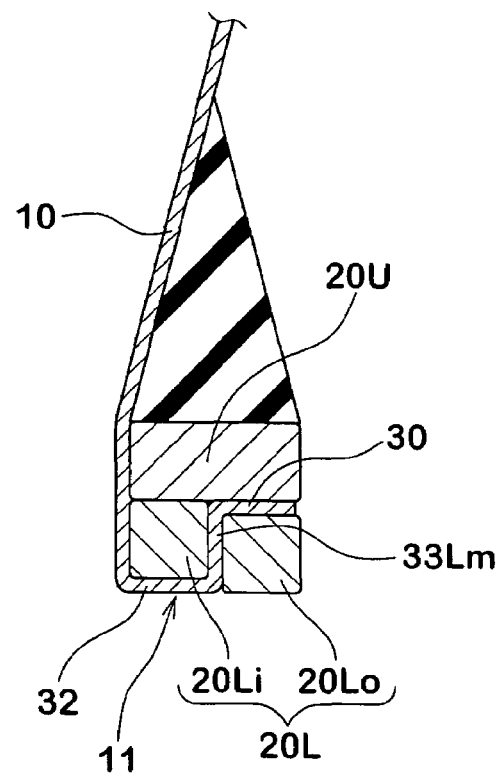
FIG. 10A is a brief view showing an example of a bead structure in accordance with a second embodiment.
Figure 10B:
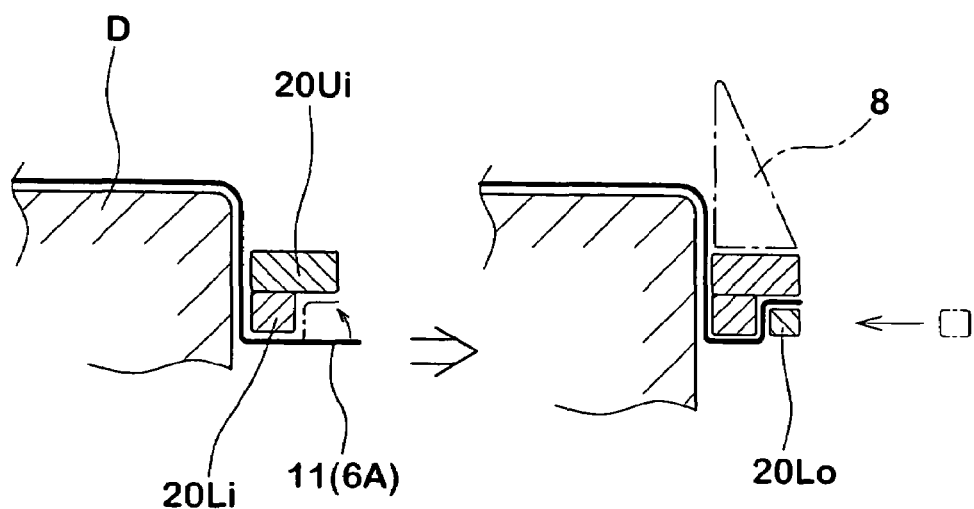
FIG. 10B is a brief view showing a forming method thereof.

In this case, the bead structure in FIG. 10A can be formed in accordance with a method as shown in FIG. 10B. The bead structure can be formed by first winding up the ply lock portion 11 of the carcass ply 6A wound on the drum D along the outer surface of the lower inner separated portion 20Li and the lower surface of the upper core separated piece 20U, thereafter fitting the lower outer separated portion 20Lo to the outer surface side of the lower inner separated portion 20Li and the lower surface side of the upper core separated piece 20U.

Figure 11A:
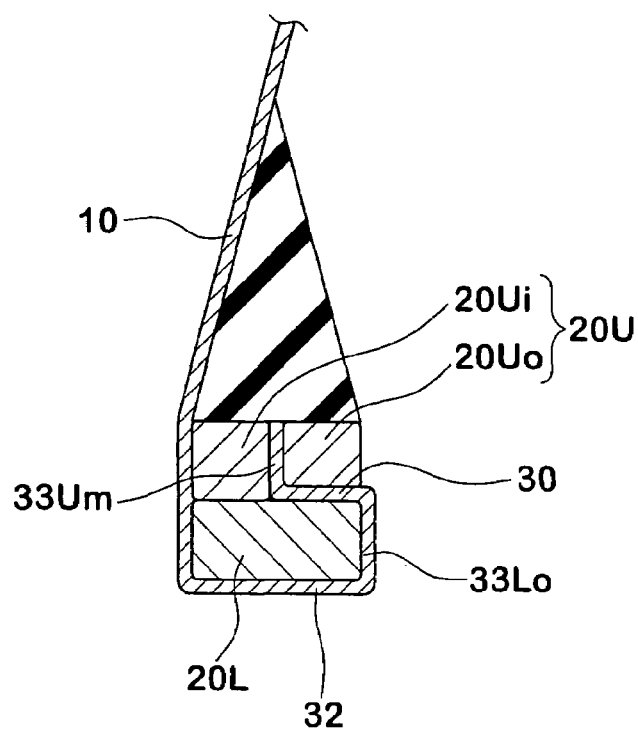
FIG. 11A is a brief view showing another example of the bead structure in accordance with the second embodiment.

Further, FIG. 11A shows another embodiment of the bead structure in accordance with the second embodiment. In the present example, the core lower ply portion 32 is connected to the ply main body portion 10. Further, the core lower ply portion 32 is connected to the separated piece horizontal ply portion 30 via a lower outer vertical ply portion 33Lo extending to the upper side in the radial direction along the outer surface of the lower core separated piece 20L. Further, the separated piece horizontal ply portion 30 is continuously provided with an upper middle vertical ply portion 33Um, which is folded to an upper side in the radial direction and is pinched between the upper inner separated portion 20Ui and the upper outer separated portion 20Uo.

Figure 11B:
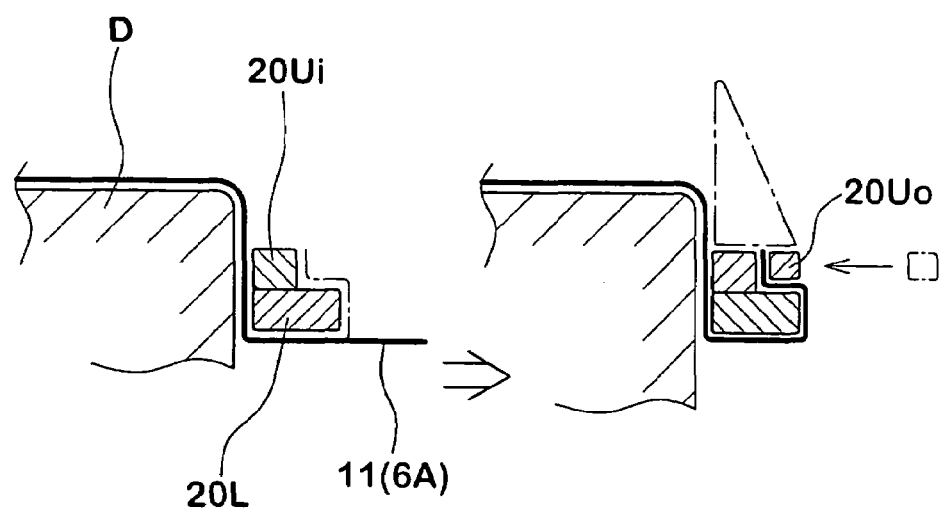
FIG. 11B is a brief view showing a forming method thereof.

In this case, the bead structure in FIG. 11A can be formed in accordance with a method shown in FIG. 11B. The bead structure can be formed by first winding up the ply lock portion 11 of the carcass ply 6A wound on the drum D along the outer surface and the upper surface of the lower core separated piece 20L and the outer surface of the upper inner core separated portion 20Ui, thereafter fitting the upper outer separated portion 20Uo to the upper surface side of the lower core separated portion 20L and the outer surface side of the upper inner separated portion 20Ui.

Figure 12A:
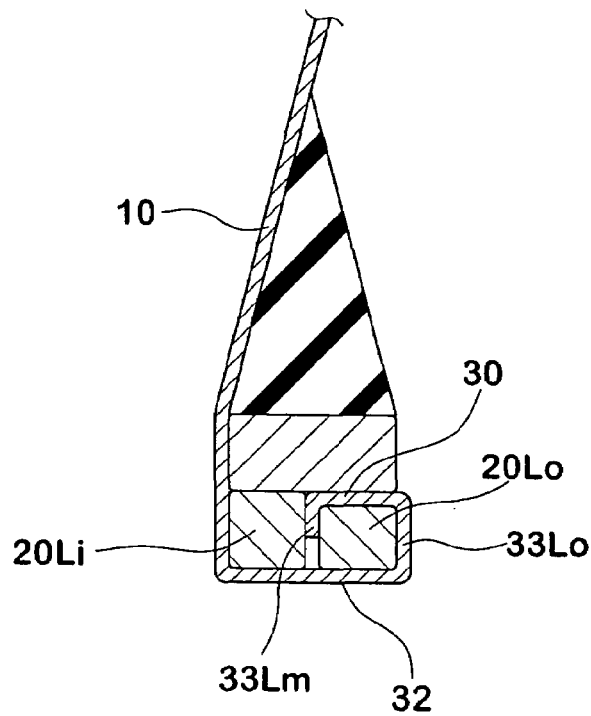
FIG. 12A is a brief view showing the other example of the bead structure in accordance with the second embodiment.

Further, FIG. 12A shows the other embodiment of the bead structure in accordance with the second embodiment. The present example is different from the structure in FIG. 11A only in a point that the separated piece horizontal ply portion 30 is continuously provided with the lower middle vertical ply portion 33Lm which is folded downward in the radial direction and is pinched between the lower inner separated portion 20Li and the lower outer separated portion 20Lo.

Figure 12B:
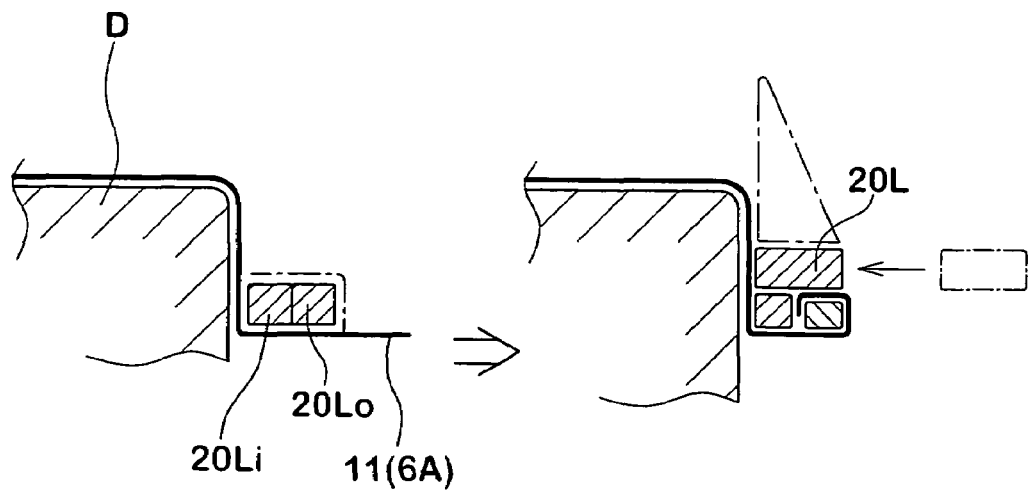
FIG. 12B is a brief view showing a forming method thereof.

In this case, the bead-structure in FIG. 12A can be formed in accordance with a method as shown in FIG. 12B. The bead structure can be formed by first winding up the ply lock portion 11 of the carcass ply 6A wound on the drum D along the lower surface of the lower inner separated portion 20Li, and the bottom surface, the outer surface and the upper surface of the lower outer separated portion 20Lo, thereafter fitting the leading end thereof to a portion between the separated portions 20Li and 20Lo. At this time, it is possible to pinch by slightly displacing the lower inner separated portion 20Li to an inner side in the tire axial direction. The bead structure can be formed by thereafter fitting the upper core separated piece 20U to the upper surface side of the separated portions 20Li and 20Lo.

Figure 13A:
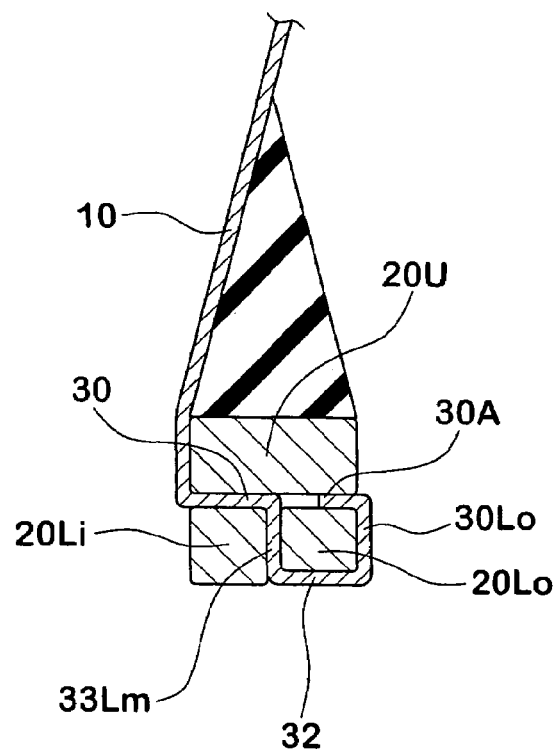
FIG. 13A is a brief view showing further the other example of the bead structure in accordance with the second embodiment.

Further, FIG. 13A shows further the other embodiment of the bead structure in accordance with the second embodiment. In the present example, the separated piece horizontal ply portion 30 is continuously provided in the ply main body portion 10. Further, the separated piece horizontal ply portion 30 is connected to the core lower ply portion 32 via the lower middle vertical ply portion 33Lm which is folded downward in the radial direction and is pinched between the lower inner separated portion 20Li and the lower outer separated portion 20Lo. It is preferable that the core lower ply portion 32 is continuously provided with a second separated piece horizontal ply portion 30A pinched between the upper core separated piece 20U and the lower outer separated portion 20Lo via the lower outer vertical ply portion 33Lo extending to the upper side in the radial direction along the outer surface of the lower outer separated portion 20Lo, as in the present example.

Figure 13B:
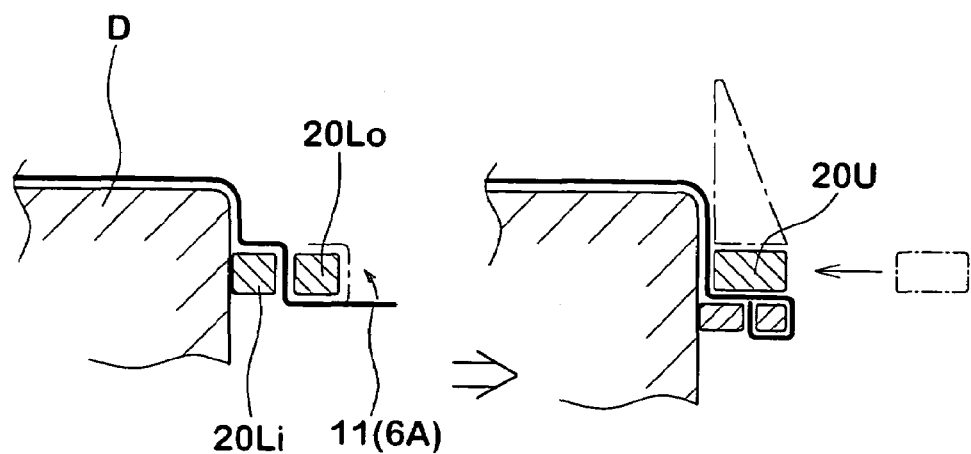
FIG. 13B is a brief view showing a forming method thereof.

In this case, the bead structure in FIG. 13A can be formed in accordance with a method as shown in FIG. 13B. The bead structure can be formed by first winding the carcass ply 6A in a state of arranging the lower inner separated portion 20Li in both side surfaces of the drum D, thereafter arranging the lower outer separated portion 20Lo adjacent to the outer side of the lower inner separated portion 20Li via the ply lock portion 11. The bead structure can be formed by thereafter winding up the ply lock portion 11 along the outer surface and the upper surface of the lower outer separated portion 20Lo and fitting the upper core separated piece 20U to the upper surface side-of the separated portions 20Li and 20Lo.

Figure 14A:
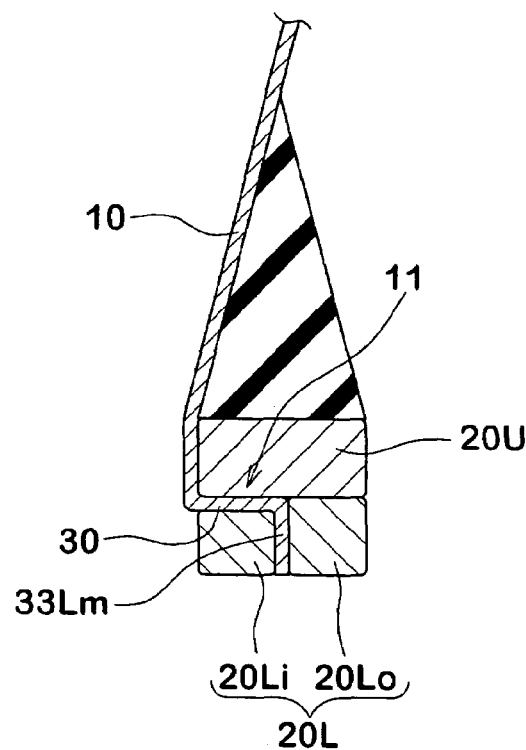
FIG. 14A is a brief view showing an example of a bead structure in accordance with a third embodiment.

A description will be given next of a bead structure in accordance with a third embodiment. In the bead structure, as shown in FIG. 14A, the ply lock portion 11 is formed so as to include the separated piece horizontal ply portion 30 pinched between the upper and lower core separated pieces 20U and 20L, and the lower middle vertical ply portion 33Lm pinched between the separated portions 20Li and 20Lo. In the present example, the separated piece horizontal ply portion 30 is continuously provided in the ply main body portion 10. Further, the separated piece horizontal ply portion 30 is continuously provided with the lower middle vertical ply portion 33Lm which is folded to the lower side in the radial direction and is pinched between the lower inner separated portion 20Li and the lower outer separated portion 20Lo. In this case, in accordance with the third embodiment, the ply lock portion 11 is formed so as to have no portion protruding to the upper side in the radial direction from the upper surface in the radial direction of the bead core and no portion protruding to the lower side in the radial direction from the lower surface in the radial direction of the bead core.

In the third embodiment, since the ply lock portion 11 is increased in the folding number and is pinched between two positions in the same manner, the ply lock portion can be firmly fixed.

Figure 14B:
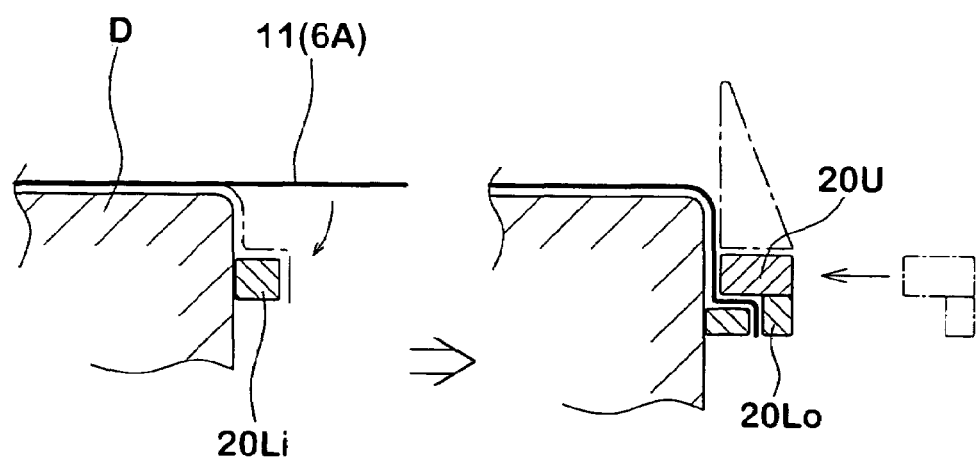
FIG. 14B is a brief view showing a forming method thereof.

In this case, the bead structure in FIG. 14A can be formed in accordance with a method as shown in FIG. 14B. The bead structure can be formed by first winding the carcass ply 6A in a state in which the lower inner separated portion 20Li is arranged in both side surfaces of the drum D, thereafter winding the ply lock portion 11 downward along the upper surface and the outer surface of the lower inner separated portion 20Li. The bead structure can be formed by thereafter fitting the lower outer separated portion 20Lo and the upper core separated piece 20U to the outer surface and the upper surface side of the lower inner separated portion 20Li.

The description is in detail given above of the particularly preferable embodiments in accordance with the present invention, however, the present invention can be carried out by variously modifying the structure without being limited to the illustrated embodiments.

EMBODIMENTS

A tire having the structure in FIG. 1 and a tire size of 175/65R14 is manufactured by way of trial on the basis of the specification in Table 1. Further, a vertical spring constant, a horizontal spring constant, a tire weight, a rolling resistance, a steering stability, uniformity and a carcass cord path of each of the trial tires are measured and compared. In this case, the other specifications than the specification in Table 1 are set to the same.

In this case, all the bead cores employ a four-row three-stage structure (4+4+4) having a rectangular cross sectional shape and using a steel wire with a wire diameter of 1.20 mm. Further, the carcass-is formed by one ply using a polyester cord (1100 dtex/2).

(1) Vertical Spring Constant:

The vertical spring constant is measured on the basis of a rim (5.5J×14), an internal pressure (200 kPa) and a vertical load (3.3 kN) by using an indoor tester, and the value is indicated by an index number obtained by setting the prior art to 100. The larger the value is, the higher the spring constant is.

(2) Horizontal Spring Constant:

The horizontal spring constant is measured on the basis of a rim (5.5J×14), an internal pressure (200 kPa), a vertical load (3.3 kN) and a horizontal load (0.5 kN) by using the indoor tester, and the value is indicated by an index number obtained by setting the prior art to 100. The larger the value is, the higher the spring constant is.

(3) Tire Weight:

The weight of one tire is measured, and is indicated by an index number obtained by setting the prior art to 100. The smaller the value is, the lighter the weight is.

(4) Rolling Resistance:

The rolling resistance is measured on the basis of a rim (5.5J×14), an internal pressure (200 kPa), a load (3.3 kN) and a speed (80 km/h) by using a rolling resistance tester, and the value is indicated by an index number obtained by setting the prior art to 100. The smaller the value is, the smaller and better the rolling resistance is.

(5) Steering Stability:

The trial tire is attached to four wheels of a vehicle (1400 cc, FF vehicle) on the basis of a rim (5.5J×14) and an internal pressure (200 kPa), and the vehicle runs on a tire test course having a dry asphalt road surface. A handle response and a ride quality at that time are evaluated by a ten scale method in which the prior art is set to 7 point, in accordance with a sensory evaluation of a driver. The larger the value is, the better the steering stability is.

(6) Uniformity:

A secondary TFV is measured on the basis of an internal pressure (200 kPa) and a load (3.3 KN) in accordance with JASOc607 by using a uniformity tester, and is indicated by an index obtained by setting the prior art to 100. The smaller the value is, the better the uniformity is.

(7) Cord Path:

The tire is dissembled, the carcass cord length (cord path) between the bead cores is measured, and an average value is indicated by an index obtained by setting the prior art to 100. The smaller the value is, the shorter the cord path is, thereby showing that the slack of the carcass cord is reduced at a time of vulcanizing.

TABLE 1

Figure 15:
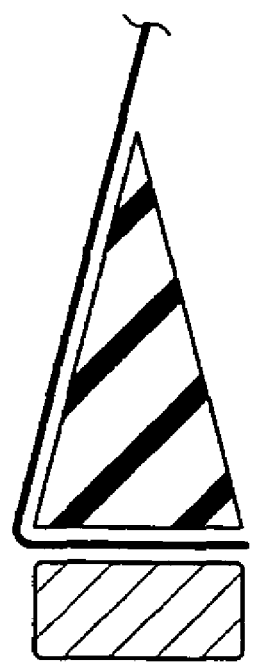
FIG. 15 is a view briefly showing a bead structure used in a comparative embodiment in Table 1.
Figure 16B:
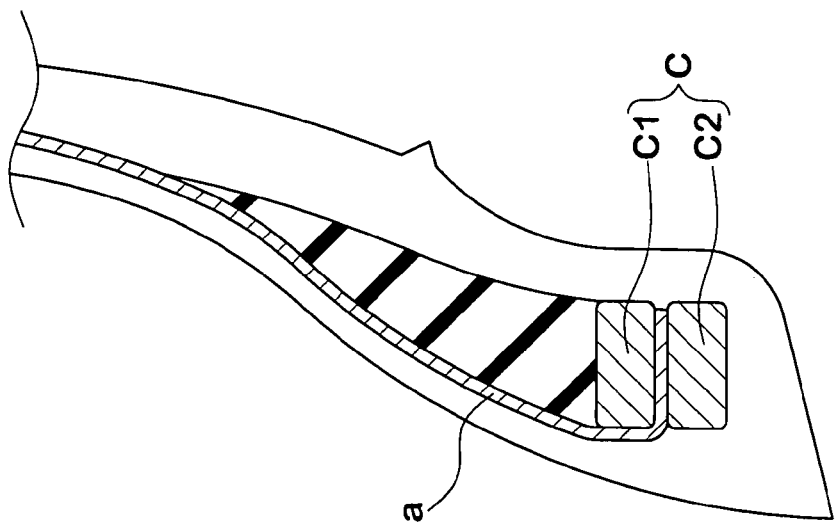

|  | Prior art | Comparative Embodiment 1 | Comparative Embodiment 2 | Embodiment 1 | Embodiment 2 | Embodiment 3 | Embodiment 4 | Embodiment 5 | Embodiment 6 | Embodiment 7 | Embodiment 8 | Embodiment 9 |
|---|---|---|---|---|---|---|---|---|---|---|---|---|
| Bead structure (FIG.) | FIG. 16A | FIG. 16B | FIG. 15 | FIG. 2 | FIG. 5A | FIG. 6A | FIG. 8A | FIG. 10A | FIG. 11A | FIG. 12A | FIG. 13A | FIG. 14A |
| Bead apex Rubber height h1 (mm) | 30 | 30 | 30 | 30 | 30 | 30 | 15 | 30 | 30 | 15 | 15 | 15 |
| With or without fold-back portion | With | Without | Without | Without | Without | Without | Without | Without | Without | Without | Without | Without |
| With or without lock portion | Without | With | With | With | With | With | With | With | With | With | With | With |
| Vertical spring constant | 100 | 93 | 93 | 99 | 99 | 98 | 96 | 98 | 102 | 98 | 100 | 97 |
| Horizontal spring constant | 100 | 98 | 92 | 99 | 99 | 98 | 96 | 98 | 100 | 98 | 102 | 96 |
| Tire weight | 100 | 98 | 98 | 98 | 98 | 97 | 96 | 98 | 98 | 95 | 95 | 95 |
| Rolling resistance | 100 | 97 | 97 | 97 | 97 | 97 | 95 | 97 | 98 | 96 | 95 | 95 |
| Steering stability |  |  |  |  |  |  |  |  |  |  |  |  |
| Response | 7 | 6.5 | 5.5 | 7 | 7 | 7 | 7.5 | 7 | 7.5 | 7 | 8 | 7 |
| Ride quality | 7 | 7.5 | 6.5 | 7.5 | 7 | 7.5 | 6.5 | 7 | 6.5 | 7 | 6.5 | 7.5 |
| TFV secondary | 100 | 96 | 95 | 90 | 86 | 93 | 80 | 90 | 83 | 83 | 75 | 83 |
| Cord path | 100 | 98.5 | 99 | 98 | 98 | 98 | 96.5 | 98 | 97 | 97 | 96.5 | 97 |

The tire in accordance with the embodiments can inhibit the slack of the carcass cord, and the dispersion of the tension, on the basis of the increased locking force to the carcass ply. As a result, as shown in Table 1, there can be confirmed that it is possible to increase the uniformity and it is possible to improve the handle response.

What is claimed is:

1. A pneumatic tire comprising:

a bead core constituted by upper and lower core separated pieces arranged in a bead portion and separated in upper and lower sides in a radial direction;

a bead apex rubber extending from an upper surface in a radial direction of said bead core to an upper side in the radial direction; and a carcass ply constituted by a ply main body portion reaching the bead core of said bead portion from a tread portion via a side wall portion, and a ply lock portion connected to the ply main body portion and locked to said bead core, wherein said ply lock portion includes a separated piece horizontal ply portion pinched between said upper and lower core separated pieces, and an apex and core horizontal ply portion pinched between the upper surface in the radial direction of said bead core and said bead apex rubber, and there is no portion protruding to an upper side in the radial direction from said apex and core horizontal ply portion, and wherein said apex and core horizontal ply portion is directly connected to said ply main portion, and said apex and core horizontal ply portion is connected to said separated piece horizontal ply portion via an upper outer vertical ply portion extending to a lower side in a radial direction along a side surface of said upper core separated piece; and the ply lock portion does not include an upper inner vertical ply portion extending along an inner side surface of said upper core separated piece.

2. A pneumatic tire comprising:

a bead core constituted by upper and lower core separated pieces arranged in a bead portion and separated in upper and lower sides in a radial direction;

a bead apex rubber extending from an upper surface in a radial direction of said bead core to an upper side in the radial direction; and a carcass ply constituted by a ply main body portion reaching the bead core of said bead portion from a tread portion via a side wall portion, and a ply lock portion connected to the ply main body portion and locked to said bead core, wherein said ply lock portion includes a separated piece horizontal ply portion pinched between said upper and lower core separated pieces, and an apex and core horizontal ply portion pinched between the upper surface in the radial direction of said bead core and said bead apex rubber, and there is no portion protruding to an upper side in the radial direction from said apex and core horizontal ply portion, and wherein said lower core separated piece is constituted by a lower inner separated portion and a lower outer separated portion which are separated into inner and outer sides in a tire axial direction, and said separated piece horizontal ply portion is continuously provided with a lower middle vertical ply portion which is folded to a lower side in a radial direction and is pinched between said lower inner separated portion and the lower outer separated portion.

3. A pneumatic tire comprising:

a bead core constituted by upper and lower core separated pieces arranged in a bead portion and separated in upper and lower sides in a radial direction;

a bead apex rubber extending from an upper surface in a radial direction of said bead core to an upper side in the radial direction; and a carcass ply constituted by a ply main body portion reaching the bead core of said bead portion from a tread portion via a side wall portion, and a ply lock portion connected to the ply main body portion and locked to said bead core, wherein said ply lock portion includes a separated piece horizontal ply portion pinched between said upper and lower core separated pieces, and an apex and core horizontal ply portion pinched between the upper surface in the radial direction of said bead core and said bead apex rubber, and there is no portion protruding to an upper side in the radial direction from said apex and core horizontal ply portion, and wherein said upper core separated piece is constituted by an upper inner separated portion and an upper outer separated portion which are separated into inner and outer portions in the tire axial direction, and said apex and core horizontal ply portion is connected to said separated piece horizontal ply portion via an upper middle vertical ply portion which is folded to a lower side in a radial direction and is pinched between said upper inner separated portion and the upper outer separated portion.

4. A pneumatic tire as claimed in claim 3, wherein said separated piece horizontal ply portion is continuously provided with a core lower ply portion extending along a lower surface of said lower core separated piece via a lower vertical ply portion extending to a lower side in the radial direction along a side surface of said lower core separated piece.

5. A pneumatic tire comprising:

a bead core constituted by upper and lower core separated pieces arranged in a bead portion and separated in upper and lower sides in a radial direction;

a bead apex rubber extending from an upper surface in a radial direction of said bead core to an upper side in the radial direction; and a carcass ply constituted by a ply main body portion reaching the bead core of said bead portion from a tread portion via a side wall portion, and a ply lock portion connected to the ply main body portion and locked to said bead core, wherein said ply lock portion includes a separated piece horizontal ply portion pinched between said upper and lower core separated pieces, and an apex and core horizontal ply portion pinched between the upper surface in the radial direction of said bead core and said bead apex rubber, and there is no portion protruding to an upper side in the radial direction from said apex and core horizontal ply portion, and wherein said upper core separated piece is constituted by an upper inner separated portion and an upper outer separated portion which are separated into inner and outer portions in the tire axial direction, said separated piece horizontal ply portion is continuously provided in said ply main portion, and said separated piece horizontal ply portion is connected to said apex and core horizontal ply portion via an upper middle vertical ply portion which is folded to an upper side in a radial direction and is pinched between said upper inner separated portion and the upper outer separated portion.

6. A pneumatic tire as claimed in claim 5, wherein said apex and core horizontal ply portion is continuously provided with a core lower ply portion extending along a lower surface of said lower core separated piece, via an outer vertical ply portion extending to a lower side in a radial direction along a side surface of said bead core.

7. A pneumatic tire comprising:

a bead core constituted by upper and lower core separated pieces arranged in a bead portion and separated in upper and lower sides in a radial direction;

a bead apex rubber extending from an upper surface in a radial direction of said bead core to an upper side in the radial direction; and a carcass ply constituted by a ply main body portion reaching the bead core of said bead portion from a tread portion via a side wall portion, and a ply lock portion connected to the ply main body portion and locked to said bead core, wherein said upper core separated piece is constituted by an upper inner separated portion and an upper outer separated portion separated into inner and outer sides in a tire axial direction, or the lower core separated piece is constituted by a lower inner separated portion and a lower outer separated portion separated into inner and outer sides in the tire axial direction, said ply lock portion includes a separated piece horizontal ply portion pinched between said upper and lower core separated pieces, and a core lower ply portion extending along a lower surface of said lower core separated piece, and wherein there is no portion protruding to an upper side in the radial direction from the upper surface in the radial direction of said bead core.

8. A pneumatic tire as claimed in claim 7, wherein said core lower ply portion is continuously provided in said ply main portion, and said core lower ply portion is connected to said separated piece horizontal ply portion via a lower middle vertical ply portion which is folded to an upper side in a radial direction and is pinched between said lower inner separated portion and the lower outer separated portion.

9. A pneumatic tire as claimed in claim 7, wherein said core lower ply portion is continuously provided in said ply main portion, and said core lower piy portion is connected to said separated piece horizontal ply portion via a lower outer vertical piy portion extending to a upper side in a radial direction along a side surface of the lower core separated piece.

10. A pneumatic tire as claimed in claim 9, wherein said separated piece horizontal ply portion is continuously provided with an upper middle vertical ply portion which is folded to an upper side in a radial direction and is pinched between said upper inner separated portion and the upper outer separated portion.

11. A pneumatic tire as claimed in claim 9, wherein said separated piece horizontal ply portion is continuously provided with a lower middle vertical ply portion which is folded to a lower side in a radial direction and is pinched between said lower inner separated portion and the lower outer separated portion.

12. A pneumatic tire as claimed in claim 7, wherein said separated piece horizontal ply portion is continuously provided in said ply main portion, and said separated piece horizontal ply portion is connected to said core lower ply portion via a lower middle vertical ply portion which is folded to a lower side in a radial direction and is pinched between said lower inner separated portion and the lower outer separated portion.

13. A pneumatic tire comprising:
  a bead core constituted by upper and lower core separated pieces arranged in a bead portion and separated in upper and lower sides in a radial direction;
  a bead apex rubber extending from an upper surface in a radial direction of said bead core to an upper side in the radial direction; and
  a carcass ply constituted by a ply main body portion reaching the bead core of said bead portion from a tread portion via a side wall portion, and a ply lock portion connected to the ply main body portion and locked to said bead core,
  wherein said lower core separated piece is constituted by a lower inner separated portion and a lower outer separated portion separated into inner and outer sides in the tire axial direction,
  wherein said ply lock portion is provided with a separated piece horizontal ply portion pinched between said upper and lower core separated pieces, and a lower middle vertical ply portion folded to a lower side in the radial direction from said separated piece horizontal ply portion, pinched between said lower inner separated portion and the lower outer separated portion and being intermittent therebetween, and
  wherein the ply lock portion has no portion protruding to an upper side in the radial direction from the upper surface in the radial direction of said bead core and no portion protruding to a lower side in the radial direction from the lower surface in the radial direction of the bead core.

* * * * *